US009002681B2

(12) United States Patent
Navarro Luna et al.

(10) Patent No.: US 9,002,681 B2
(45) Date of Patent: Apr. 7, 2015

(54) COMPUTER-ASSISTED METHOD FOR OPTIMISING SURFACES OF COMPOSITE-MATERIAL STRUCTURES

(75) Inventors: Antonio Navarro Luna, Madrid (ES); José Valeriano La Torre, Madrid (ES)

(73) Assignee: Airbus Operations S.L., Getafe (ES)

( * ) Notice: Subject to any disclaimer, the term of this patent is extended or adjusted under 35 U.S.C. 154(b) by 369 days.

(21) Appl. No.: 13/318,914

(22) PCT Filed: May 12, 2010

(86) PCT No.: PCT/ES2010/070318
§ 371 (c)(1),
(2), (4) Date: Jan. 10, 2012

(87) PCT Pub. No.: WO2010/130863
PCT Pub. Date: Nov. 18, 2010

(65) Prior Publication Data
US 2012/0123743 A1    May 17, 2012

(30) Foreign Application Priority Data
May 13, 2009   (ES) .................................. 200901214

(51) Int. Cl.
*G06F 17/50*      (2006.01)
(52) U.S. Cl.
CPC ........ *G06F 17/5095* (2013.01); *G06F 2217/42* (2013.01); *G06F 2217/44* (2013.01); *G06F 2217/46* (2013.01)

(58) Field of Classification Search
CPC .......... B64C 23/06; B64C 3/385; B64C 3/48; B64C 3/00; B64C 2001/0081; Y02T 50/162; G06F 17/50; G06F 17/5004; G06F 17/5018
See application file for complete search history.

(56) References Cited

U.S. PATENT DOCUMENTS

| | | | |
|---|---|---|---|
| 5,038,291 A * | 8/1991 | Wang et al. ...................... 700/98 |
| 7,010,472 B1 * | 3/2006 | Vasey-Glandon et al. ......... 703/6 |
| 7,243,055 B2 * | 7/2007 | Chen et al. ......................... 703/2 |
| 8,350,145 B2 * | 1/2013 | Angel ............................ 136/246 |
| 2008/0208540 A1 * | 8/2008 | Burgos Gallego et al. ....... 703/1 |
| 2010/0230541 A1 * | 9/2010 | Benavides et al. ......... 244/123.1 |

OTHER PUBLICATIONS

Elber Model Fabrication Using Surface Layout Projection Computer-Aided Design, vol. 27, No. 4, pp. 283-291, 1995 Elvervier Science Ltd.*

(Continued)

*Primary Examiner* — Omar Fernandez Rivas
*Assistant Examiner* — Cuong Luu
(74) *Attorney, Agent, or Firm* — Ladas & Parry LLP

(57) ABSTRACT

Computer-assisted method for optimizing surfaces of composite-material structures as part of a design process that includes the following stages: a) Providing a multi-cell surface (11) of the structure obtained using aerodynamic calculations; b) Transforming said multi-cell surface (11) into an optimized surface (13) with fewer cells, concatenating contiguous cells and maintaining point and tangent continuity between them; c) Using said optimized surface (13) as geometric master when designing the components of the structure. The method is particularly applicable to the design of structures with a plurality of components and in particular fuselages of aircraft made of composite material. The invention also relates to a computer program for performing the method.

4 Claims, 3 Drawing Sheets

(56) References Cited

OTHER PUBLICATIONS

Steijl et al. Sliding Mesh Algorithm of CFD Analysis of Helicopter Rotor-Fuselage Aerodynamics International Journal for Numerical Methods in Fluids, Feb. 2008, 58, pp. 527-549.*

Elber Free Form Surface Analysis Using A Hybrid of Symbolic and Numeric Computation The University of Utah, Department of Computer Science, Dec. 1992.*

* cited by examiner

COMPUTER-ASSISTED METHOD FOR OPTIMISING SURFACES OF COMPOSITE-MATERIAL STRUCTURES

SCOPE OF THE INVENTION

This invention relates to a computer-assisted method for designing composite-material structures and, specifically, a method that involves obtaining and handling an optimised surface of said structures.

BACKGROUND TO THE INVENTION

In certain engineering fields, there is a marked tendency to increase the number of structures made of composite materials and indeed in sectors such as the aeronautical sector many of the basic structures used in aircraft, such as fuselages and wings, may be produced using composite materials.

These structures include different components that can be produced using pieces of composite-material fabric with carbon fibres arranged with different orientations.

These structures are designed using a complex process that includes stages for making calculations, designing the fabric model and analysing the feasibility of producing its different components, with feedback loops when changes are made to any of these stages.

Engineers specialising in calculations use calculation programs to calculate the performance of each part under given loads, and design engineers use CAD systems and the specifications provided by the results of the calculation to analyse and design the different components, including generation of fabric models, i.e. determining the placement and outline of the pieces of fabric that make up the sheets.

In the current state of the art in the different design activities mentioned for components in a composite-material structure, multi-cell surfaces obtained during the calculation stage are used as "master geometries" for the structure in question. The problem with using these multi-cell surfaces is that errors may occur in certain stages of the design of the components in these structures, in particular when updating the solid models and/or fabric models, as a result of changes in the master geometry. Moreover, these updating processes require a lot of time to complete, which lengthens the design process.

This invention is intended to resolve these issues.

SUMMARY OF THE INVENTION

One purpose of this invention is to provide a computer-assisted method for designing composite-material structures with a plurality of components that facilitates the performance of the different stages of designing the structure that involve the geometric definition of its surface.

Another purpose of this invention is to provide a computer-assisted method for designing composite-material structures with a plurality of components that reduces the performance time of the different stages of designing the structure that involve the geometric definition of its surface.

In a first aspect these and other purposes are achieved with a method that includes the following stages:

Providing a multi-cell surface of the structure obtained using aerodynamic calculations.

Transforming said multi-cell surface into an optimised surface with fewer cells, concatenating contiguous cells and maintaining point and tangent continuity between them.

Using said optimised surface as master geometry when designing the components of the structure.

In a preferred embodiment of the invention said transformation is realised, by zones, in the following sub-stages:

Breaking up each zone of the multi-cell surface into the cells that comprise it.

Obtaining the basic surfaces of said cells.

Obtaining surfaces similar to said basic surfaces with the appropriate grading and segmentation.

Matching contiguous surfaces.

Concatenating contiguous surfaces.

This is a very effective method that significantly reduces the number of cells in the starting surface.

In a second aspect, the purposes mentioned are achieved using a software program that, when run on a computer with or as part of a CAD system, facilitates the automatic or semi-automatic performance of the different stages of the method mentioned.

Other features and advantages of this invention are set out in the following detailed description of the embodiments, which illustrate their purpose, and the figures attached.

DETAILED DESCRIPTION OF THE INVENTION

To ensure the correct understanding of this invention, the meanings of some of the terms used in this description are given below:

Aeronautical structure: Set of components of a discrete part of an aircraft. For example, the rear section of the fuselage of an aircraft is a structure whose notable components include its lining and internal strengthening elements such as frames and stringers.

Fabric or Pattern: Sheet material used to form the layers of a component of a composite-material structure defined by its outline and its position on the sheet, as well as by certain physical characteristics such as the orientation of the fibre strengthening.

2D fabric model of a component: Two-dimensional representation of the pieces of fabric of a component on a CAD system. One of the purposes of the 2D fabric model is to provide the information required for each of the pieces of fabric needed to produce the component.

3D fabric model of a component: Three-dimensional representation of the fabric model of the component in its final state on a CAD system. One of the basic functions of the 3D fabric model is to facilitate its optimisation by displaying its final state.

Solid model of a component: Representation of the component on a CAD system showing both its geometry and its relevant physical properties. One of the basic functions of the solid model of a component is to provide the information required to optimise the component design.

Below is a description of a preferred embodiment of the method according to this invention in relation to the process of designing the rear part of an aircraft fuselage.

Figure 1:
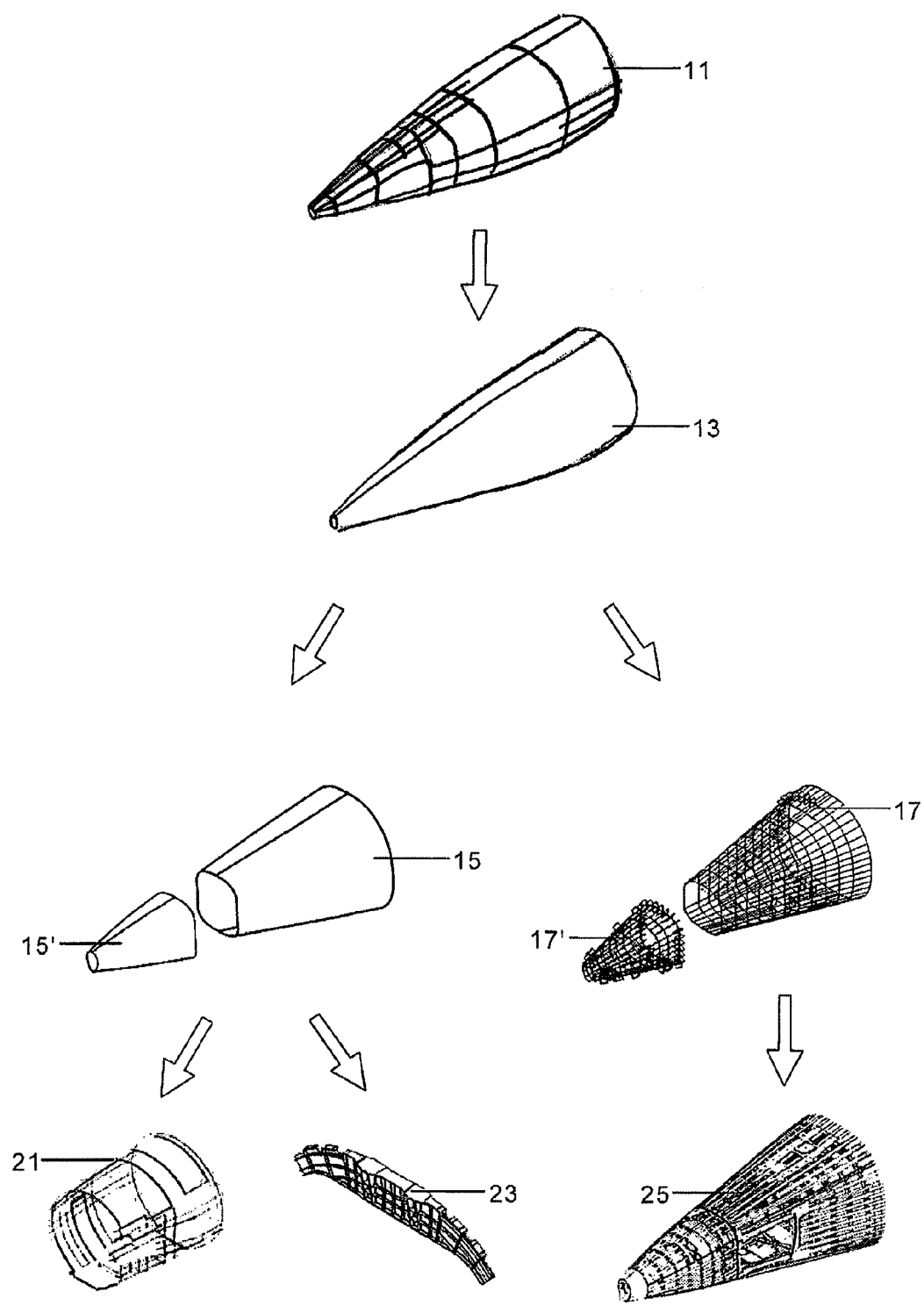
FIG. 1 is a schematic view of the process for designing the rear fuselage of an aircraft using a method according to this invention.

FIG. 1 shows that this process, albeit described very schematically, enables an expert in the field to understand the basics of this invention, and it includes the following stages:

In a first stage, a definition of the surface of the fuselage is obtained as a multi-cell surface 11 in a CAD system, using aerodynamic calculations.

In a second stage, said multi-cell surface 11 is transformed into an optimised surface 13 with just two cells.

In a third stage, using the optimised surface 13, first and second master geometric models of two sections of the fuselage 15, 15'; 17, 17' are obtained.

In the subsequent stages, fabric models 21 and solid models 23 of components of the structure are obtained from the master geometric model 15 and the assembly model 25 on the basis of the geometric models 17 and 17'.

In this design process, the basic idea of this invention is the inclusion of the second stage mentioned so that in the third and subsequent stages optimised surfaces are used, with as few cells as possible, instead of the multi-cell surfaces obtained using the aeronautical calculation.

The process for optimising multi-cell surfaces used in this second stage is based on generating new single-cell surfaces by concatenating each of the cells that define the original surface. Clearly defined surfaces (conical, circular, flat, etc.) are used to generate harmonised surfaces with the same geometric definition, which may be joined to the adjacent surface, also harmonised, as shown in the example given in FIGS. 2 and 3.

Figure 2:
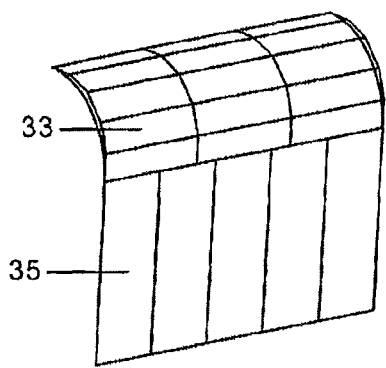
FIGS. 2 and 3 illustrate the process of transforming a surface with two cells into a single-cell surface using the method according to this invention.

FIG. 2 shows a multi-cell surface made up of two discrete elements, one circular single-cell surface 33 and one linear single-cell surface 35 with the following characteristics:

|  | Surface type | No. of components | | Order of components | |
| --- | --- | --- | --- | --- | --- |
| Surface 33 | Circular | (u) 1 | (v) 1 | (u) 4 | (v) 6 |
| Surface 35 | Flat | (u) 1 | (v) 1 | (u) 2 | (v) 6 |

Figure 3:
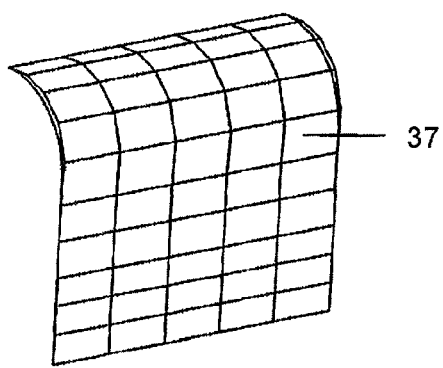
Figure 4:
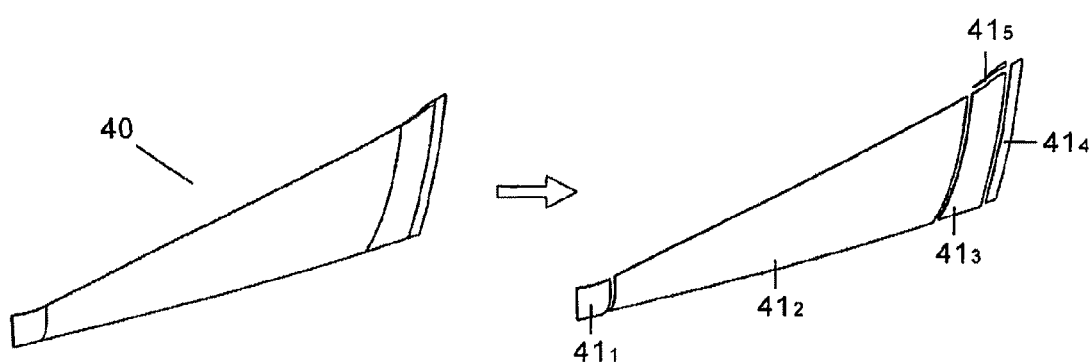
FIGS. 4 to 8 show, respectively, the five basic sub-stages in the transformation stage for turning a multi-cell surface into an optimised surface using the method according to this invention.
Figure 5:
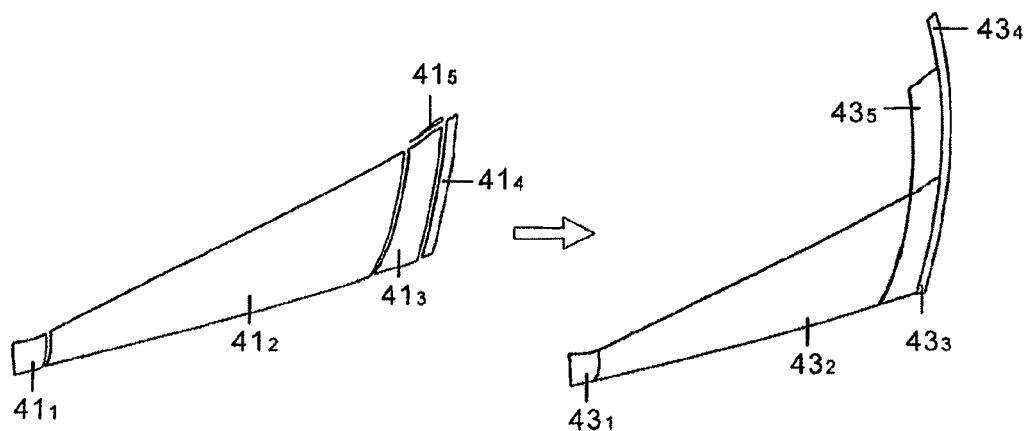
Figure 6:
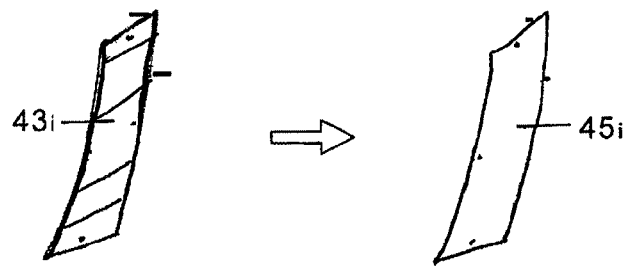
Figure 7:
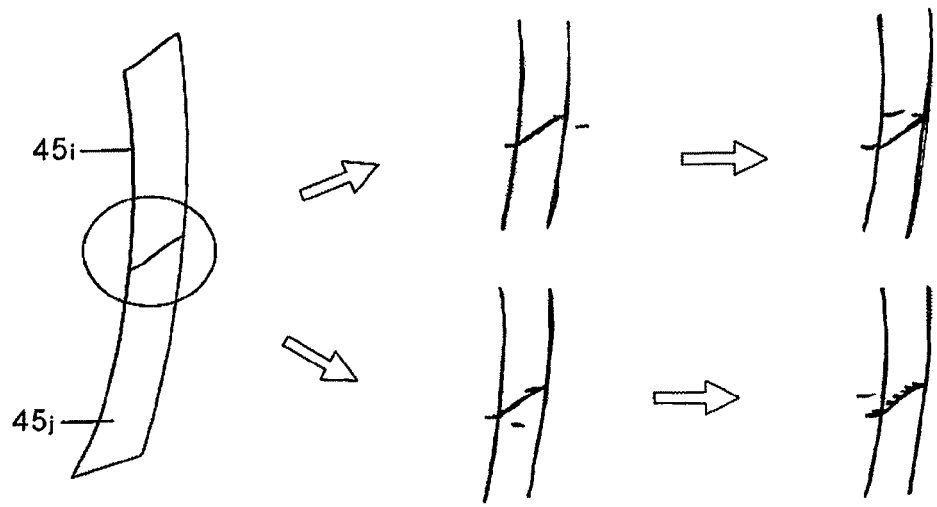
Figure 8:
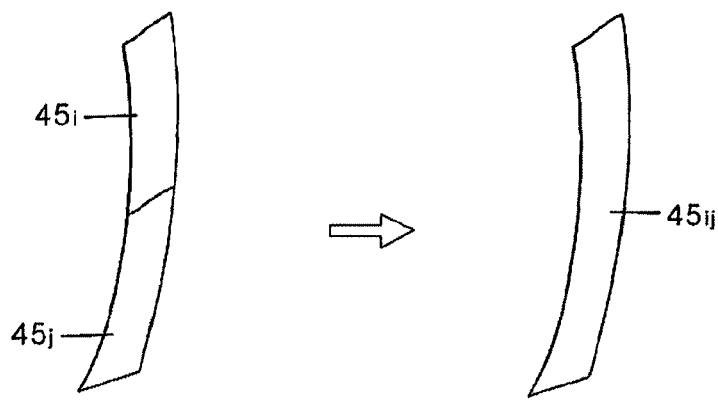

FIG. 3 shows a single-cell surface 37 created by joining surfaces 33 and 35 with harmonised control points and no visible isoparametrics or point or tangent continuity issues. Its characteristics are as follows:

|  | Surface type | No. of component | | Order of components | |
| --- | --- | --- | --- | --- | --- |
| Surface 37 | Harmonised | (u) 3 | (v) 1 | (u) 6 | (v) 6 |

In a preferred embodiment of the invention said second stage includes the following sub-stages illustrated in FIGS. 4-8.

In the first sub-stage, each zone 40 of the multi-cell surface is broken down into the cells $41_1$, $41_2$, $41_3$, $41_4$, $41_5$ that comprise it. For this purpose, the multi-cell surface 11 is zoned using appropriate criteria.

In the second sub-stage, the basic surfaces $43_1$, $43_2$, $43_3$, $43_4$, $43_5$ are obtained from said cells $41_1$, $41_2$, $41_3$, $41_4$, $41_5$.

In the third sub-stage, a similar surface $45_i$ with appropriate grading and segmentation is obtained for each of the basic surfaces $43_i$.

In the fourth sub-stage, the contiguous surfaces $45_i$, $45_j$ are matched to ensure point and tangent continuity.

In the fifth sub-stage, the contiguous surfaces $45_i$, $45_j$ are concatenated.

The method may be implemented using software in addition to the CAD tool used (such as CATIA) which includes specific code for automating those stages of the method not covered by the CAD tool used and to provide interfaces with the CAD tool in the stages that require them.

The advantages of the method according to this invention include notably the following:

It eliminates errors and facilitates updating of the solid models and the fabric models. It should be noted, for example, that the number of solid models in a rear fuselage section of an aircraft is very high (potentially more than one thousand).

It takes less time to update the solid models and the fabric models. It is estimated that handling a single-cell surface is around fifty times quicker than handling a multi-cell surface.

The modifications set out in the claims below may be included in the preferred embodiment given.

The invention claimed is:

1. Computer-assisted method for designing a composite-material structure with a plurality of components, wherein it includes the following stages:
   a) Providing a multi-cell surface (11) of the structure obtained using aerodynamic calculations;
   b) Transforming said multi-cell surface (11) into an optimised surface (13) with fewer cells,
   concatenating contiguous cells and maintaining point and tangent continuity between them;
   c) Using said optimised surface (13) as master geometry when designing the components of the structure
   wherein
      step b) includes the following sub-stages, in the different zones (40) of the multi-cell surface (11):
      b1) Breaking down each zone (40) of the multi-cell surface (11) itself into the cells ($41_1$, . . . , $41n$) that comprise it;
      b2) Obtaining the basic surfaces ($43_1$, . . . , $43_n$) of said cells;
      b3) Obtaining surfaces similar ($45_1$, . . . , $45_n$) to said basic surfaces ($43_1$, . . . , $43_n$) with the appropriate grading and segmentation;
      b4) Matching contiguous surfaces ($45_i$, $45_j$);
      b5) Concatenating contiguous surfaces ($45_i$, $41_j$) and
      at least one of said steps is performed by a computer processor.

2. Computer-assisted method according to claim 1, wherein said composite-material structure is a structure of an aircraft.

3. Computer-assisted method according to claim 2, wherein said composite-material structure is a section of a fuselage of an aircraft.

4. A non-transitory computer readable medium containing program instructions, wherein when it is run on a computer with or as part of a CAD system it performs the method according to claim 1.

* * * * *